United States Patent Office 3,561,086
Patented Feb. 9, 1971

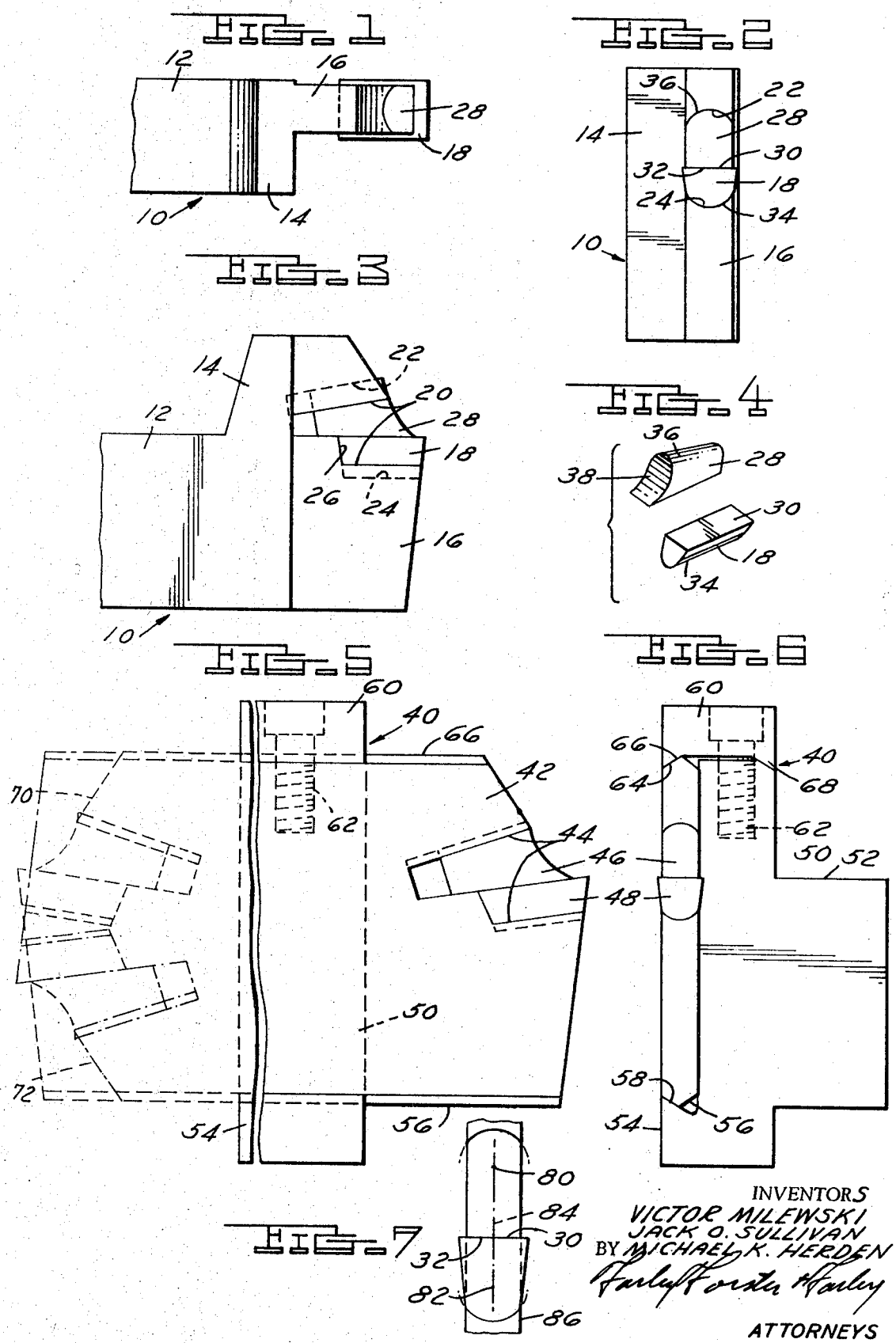

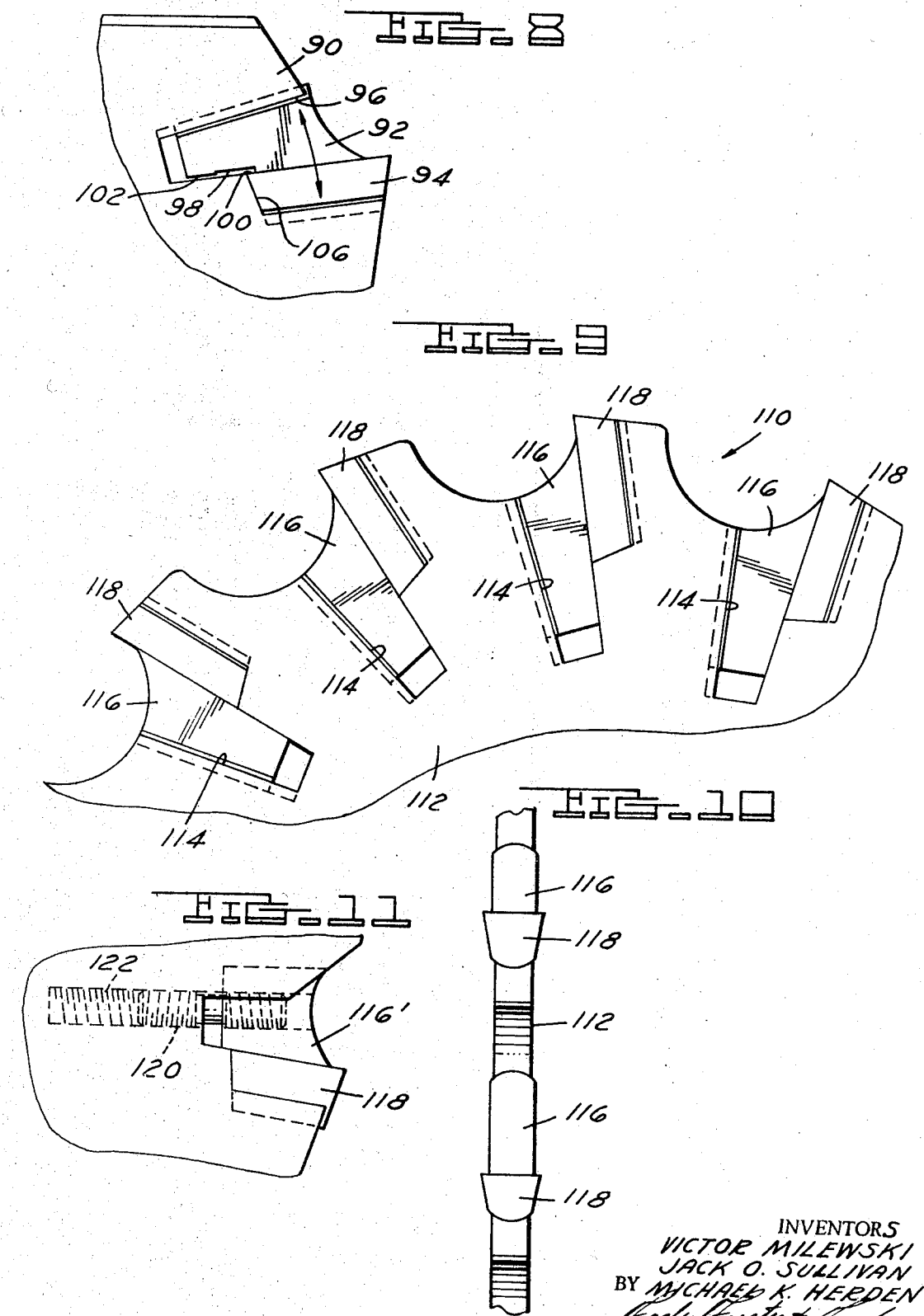

3,561,086
CUT-OFF TOOLS AND SLOTTING CUTTERS
Victor Milewski, Birmingham, Jack O. Sullivan, Glenarden, and Michael K. Herden, Detroit, Mich., assignors to The Valeron Corporation, a corporation of Michigan
Filed Mar. 20, 1968, Ser. No. 714,566
Int. Cl. B26d 1/00; B27b 33/02; B27g 13/00
U.S. Cl. 29—96                                       1 Claim

ABSTRACT OF THE DISCLOSURE

Cut-off tools and slotting cutters which include a wedge retained insert blade construction having arcuate holder seats and matching arcuate insert and wedge surfaces to establish transverse insert and wedge location on a relatively narrow holder.

BACKGROUND OF THE INVENTION

In cut-off tools and slotting cutters with replaceable cutting inserts it is important to be able to retain the cutting insert securely on a relatively narrow holder, to assure side clearance, particularly for deep cuts. In the case of a cut-off tool the forwardly projecting part of the holder is usually a separate part secured to a holder body formed to include an insert seat. The insert and seat normally have a complementary V-shape and the insert is held on the seat by an overhanging clamp fastened to the holder body.

The insert clamp when fastened to the holder body must hold the insert on its seat as near the cutting end as possible, without interfering with the cutting clearance requirements. This has been attempted with limited success by a clamp arm extending out over the insert along a major part of its length but difficulties have been encountered in the use of such clamp arrangement where close tolerances are necessary in locating the clamp and in undue set-up time to be sure the cutting edge of the insert is properly oriented and is not held in a cocked or tilted position.

Another limitation of such clamp arm arrangement is that it does not lend itself well to use in a slotting cutter where the tool instead of the work is turning.

SUMMARY OF THE INVENTION

The present invention relates to cut-off tools in general and more particularly to a wedge clamp type cut-off tool with features which are also adaptable for use in slotting cutters.

In a holder body formed to include the forwardly projecting part, which holds the cutting insert, a shouldered slot is formed in such part from the front edge back to accommodate an insert and a wedge. The insert seat is cylindrically concave, to accommodate an insert with an underside that is complementary thereto and the upper side of the slot is similarly concave to accommodate a wedge which is cylindrically shaped along its uppermost edge. The axial lines of the two cylindrical segments that form the insert seat and the reactionary wall for the wedge lie in a plane which may be parallel to the side walls of the insert holding part and for normal cut-off use in square relation to the cutting plane edge of the insert.

The same wedge clamp arrangement is easily provided in a cut-off tool with a separate forwardly projecting blade holder which is secured to the holder body and enables variable set-ups of different sized cutting inserts with the same holder. As in the first construction mentioned, no additional clamp is necessary and positive and secure positioning of the cutting insert is assured.

Of considerable production importance is the fact that the same inserts and wedges made for cut-off tools of the type proposed may also be adapted for use in slotting cutters wherein the concave cylindrical seats for the inserts and the wedges provide the same advantages of accurate alignment and transverse location in a relatively thin annular disc cutter body.

DESCRIPTION OF THE DRAWINGS

FIG. 1 is a top plan view of a cut-off tool including the features of the present invention;

FIG. 2 is an end view of the cut-off tool shown in FIG. 1;

FIG. 3 is a side elevational view thereof;

FIG. 4 is a perspective view of a cutting insert and wedge used in the cut-off tools of the present invention;

FIG. 5 is a side elevational view of another form of cut-off tool, with a separate blade holder showing alternate possible positioning of the cutter in dotted outline;

FIG. 6 is an end view of the tool of FIG. 5;

FIG. 7 is a schematic end view of the cutter insert and wedge positioned for use in a holder illustrating the geometry of the preferred arrangement;

FIG. 8 is an enlarged side elevational view of the wedge slot in a holder showing an alternative relief feature in the wedge construction;

FIG. 9 is a fragmentary side elevational section of a slotting cutter showing the present invention incorporated therein;

FIG. 10 is a top plan, or edge view, of the slotting cutter of FIG. 9; and

FIG. 11 is a detail view of an alternative differential screw locking wedge.

DETAILED DESCRIPTION OF THE PREFERRED EMBODIMENTS

FIGS. 1–4 illustrate a lathe type of cut-off tool 10 which includes a tool holder body 12 having a head 14 which includes a narrow extension on which a slightly wider cutting insert 18 is mounted.

A wedge shaped slot 20 is provided with its rearwardly converging wedge walls formed to include concave cylindrical segment surfaces 22 and 24; as best seen in FIG. 2. The part of the slot in which the cutting insert 18 is received does not extend back as far as that for the wedge and thereby provides a shoulder wall 26 against which the back wall of the insert is seated. The plane of the top wall of the cutting insert is in line with the bottom of the wedge slot extension for the wedge.

The cutting insert 18 and the wedge 28 per se are shown most clearly in FIG. 4. The insert and wedge include planar faces 30 and 32, respectively, which are engaged together in the holder. They also both include cylindrical wall surfaces 34 and 36, respectively, on their opposite sides that fit the cylindrically concave wedge wall surfaces 22 and 24 of the wedge shaped slot. The wedge 28 is formed to lie over the insert, with the wedge front edge back from the cutting edge of the insert, and is narrower than the insert to assure side cutting clearance. The wedge is relieved at its forward end 38 to provide chip clearance.

The side edges of the insert 18 extend beyond the sides of the wedge and holder extension as best seen in FIGS. 1 and 2 so that there is no side wall interference in cutting grooves or slots in a work piece.

FIGS. 5 and 6 show another form of cut-off tool 40, with a separate cutting blade holder 42 in which a like wedge shaped slot 44, wedge 46 and cutting insert 48 are provided; and consequently need not be redescribed. The holder clamp 50 having an extension 52 is formed to include a shoulder wall edge 54. The blade holder 42 has its lower edge formed to include a V-form 56 which fits an undercut chamfer 58 in the shoulder wall ledge and an overhanging clamp jaw 60 that engages the upper V-edge of the holder.

The clamp jaw 60 is coextensive with the clamp 50 and is tightened by screw fasteners 62 (only one of which is shown) to hold the blade holder in any selected position.

The V-form edges 56 and 66 on the blade holder 42 are identical and symmetrical. Consequently, the cutting insert holder may be reversed end for end, or it may be turned over, as depicted by the dotted outlines 70–72 for a like purpose or front or back slide use.

Referring now more particularly to certain details of construction, FIG. 7 shows the geometry best used in forming the wedge slots and in providing the cylindrically concave wedge wall surfaces. The axial centerlines for the wedge wall surfaces, identified by the center points 80 and 82, in the drawing end view, lie in a plane of reference 84 which is in parallel spaced relation midway between the side faces of the holder part 86, and the radial dimension of the boring or end mill cut used to form the cylindrically concave wedge wall surfaces is such as forms the open sides of the wedge slot. The wedges and inserts are formed with their engaging faces 30 and 32 normal to a plane of reference which includes their axial centerlines, and which in the drawing is the same as the reference plane 84. Consequently, in assembly within a wedge slot it is impossible for them to be misaligned.

FIG. 8 shows a modified special feature of the wedge whereby concentration of the wedge pressure is assured directly on the insert. The holder 90 is shown with a wedge 92 over an insert 94, and with both seated in the wedge slot 96, as previously described. However, the wedge is shown to include a transverse relief slot 98 protecting the back cutting edge 100 of the reversible insert and to have the heel 102 of the wedge, behind the slot, slightly relieved to provide clearance from the adjacent back shoulder wall 106 for the insert.

FIGS. 9 and 10 show a slotting cutter 110 which includes a body or holder part 112 with a plurality of wedge slots 114, wedges 116, and inserts 118 provided at its outer periphery and in the manner discussed for cut-off tools. As shown in FIG. 10, the wedges may be wider than the holder part, but are narrower than the cutting width of the inserts.

In FIG. 11, a modification is shown in which the wedges 116' are adapted to have a differential screw 120 engaged therewith and with a threaded bore 122 in the holder body, at the end of the wedge slot, as a positive rather than frictional means of retaining them in a wedge locking engagement with the inserts.

While particular preferred embodiments of the invention have been shown and described above in detail, it will be understood that numerous other modifications are possible without departing from the scope of the invention as defined in the following claim.

1. A cutting tool comprising; a holder for a cutting insert having a width greater than the adjacent width of the holder, a wedge shaped slot provided in said holder, a cutting insert and retaining wedge seated in said slot, said slot, said insert and said wedge having interengaging arcuate surfaces for completely orienting said insert and said wedge relative to said holder, said arcuate surfaces defining cylindrical concave surfaces in said slot, a holder adapter receptive of said holder in retained engagement with a face of said adapter and with said holder extending beyond one edge of said face, said holder being reversible end for end and top for bottom to provide four possible cutting positions for said cutting tool.

References Cited

UNITED STATES PATENTS

| 1,148,374 | 7/1915 | Freas | 29—105 |
| 1,348,279 | 8/1920 | Heywood | 29—105 |
| 2,037,642 | 4/1936 | Schribner | 29—105 |
| 2,972,802 | 2/1961 | Stein | 29—105 |

HARRISON L. HINSON, Primary Examiner

U.S. Cl. X.R.

29—105; 143—133; 144—218